United States Patent
Song (10) Patent No.: US 9,438,295 B1
(45) Date of Patent: Sep. 6, 2016

(54) MOBILE PHONE CASE HAVING DETACHABLE CABLE

(71) Applicant: DMAC International Co., Ltd., Seoul (KR)

(72) Inventor: Eung Song, Seoul (KR)

(73) Assignee: DMAC INTERNATIONAL CO., LTD., Seoul (KR)

( * ) Notice: Subject to any disclaimer, the term of this patent is extended or adjusted under 35 U.S.C. 154(b) by 190 days.

(21) Appl. No.: 14/402,094

(22) PCT Filed: Oct. 24, 2013

(86) PCT No.: PCT/KR2013/009531
§ 371 (c)(1),
(2) Date: Nov. 18, 2014

(87) PCT Pub. No.: WO2015/053424
PCT Pub. Date: Apr. 16, 2015

(30) Foreign Application Priority Data

Oct. 7, 2013 (KR) .......................... 10-2013-0119431

(51) Int. Cl.
| | | |
|---|---|---|
| *H04B 1/38* | (2015.01) | |
| *H04B 1/3888* | (2015.01) | |
| *H04M 1/02* | (2006.01) | |
| *H04M 1/725* | (2006.01) | |

(52) U.S. Cl.
CPC ......... *H04B 1/3888* (2013.01); *H04M 1/0274* (2013.01); *H04M 1/72527* (2013.01)

(58) Field of Classification Search
CPC ........... H04M 1/72527; H04M 1/0274; H02J 7/0044
USPC ..................... 455/557, 566, 573, 572, 343.1; 320/115; 713/340
See application file for complete search history.

(56) References Cited

U.S. PATENT DOCUMENTS

| | | | | |
|---|---|---|---|---|
| 8,838,171 | B2 * | 9/2014 | Jang ........................ | G06F 1/266 455/557 |
| 9,258,434 | B1 * | 2/2016 | Landry .............. | H04N 1/00148 |
| 2005/0085278 | A1 * | 4/2005 | Lin ................... | H04M 1/72527 455/573 |
| 2010/0069117 | A1 * | 3/2010 | Knighton ............ | H04M 1/0274 455/557 |
| 2016/0172883 | A1 * | 6/2016 | Globerson ............ | H02J 7/0044 320/115 |

FOREIGN PATENT DOCUMENTS

| | | |
|---|---|---|
| KR | 20-0342918 | 2/2004 |
| KR | 20-0362826 | 9/2004 |
| KR | 10-20040104943 | 2/2007 |
| KR | 10-2011-0032265 | 3/2011 |
| KR | 20-0457265 | 12/2011 |
| KR | 20-2013-0003893 | 7/2013 |

* cited by examiner

*Primary Examiner* — Shaima Q Aminzay
(74) *Attorney, Agent, or Firm* — East West Law Group; Heedong Chae (57) ABSTRACT

The present invention relates to a mobile phone case having detachable cable. More specifically, the mobile phone case having detachable cable allow the users to conveniently carry the USB cable along with the mobile phone by attaching the cable onto the mobile phone cover. The cable is to connect the mobile phone to any external device such as a computer or a battery charger. The mobile phone case having a detachable cable includes a cover to cover the sides of a mobile phone; a cable housing to receive a detachable cable therein; and a cable having a USB connector to be connected to a USB port of an external device, a mobile phone connector to be connected to a port of the mobile phone, and a data cable connecting the two connectors and transmitting data between external devices to the mobile phone.

8 Claims, 8 Drawing Sheets

MOBILE PHONE CASE HAVING DETACHABLE CABLE

CROSS-REFERENCE TO RELATED APPLICATION

This application claims the benefit of Korean Application No. 10-2013-0119431, filed on Oct. 7, 2013, with the Korean Intellectual Property Office, the disclosure of which is incorporated herein by reference.

BACKGROUND OF THE INVENTION

1. Field of the Invention

The present invention relates to a mobile phone case having a detachable cable. More specifically, the invention relates to a mobile phone case having a detachable cable which is used to connect the mobile phone to a personal computer or a mobile phone charger for allowing the users to conveniently carry the cable received and stored in the mobile phone case.

2. Description of the Related Art

The mobile communication methods generally includes personal communication system (PCS), code division multiple access (CDMA), or global system of mobile communication (GSM), and they allow users to have a voice call or text messaging, even when they are moving, by using a portable mobile phone device commonly called as a mobile phone.

Recently, mobile phones have become wide spread and popular and the use of a mobile phone is not limited to just making a voice call or sending a text message, but also performing wired or wireless data transmission and doing personal businesses irrespective of time and place.

Moreover, consumers are losing interest in conventional thick and plain mobile phones, but instead, slim and light mobile phones are gaining popularity. These new kinds of mobile phones, however, are vulnerable to external shocks and mobile phone cases or covers are used to protect the mobile phones.

Furthermore, these mobile phones are also used to send and receive data to and from a computer through a wired communication. For this kind of wired communication, a cable, called a universal serial bus (USB) cable, is used to connect the mobile phone to the computer. A USB cable has a USB connector on one end to be connected to a USB port of a computer and a mobile phone connector on the other end to be connected to a port of a mobile phone.

However, there are a number of different types and lengths of USB cables and the long cable of a USB cable is inconvenient to use. A USB cable cannot be stored in a mobile phone and a user has to carry it separately along with a mobile phone.

Dealing with this inconvenience, Korean Patent No. 20-0362826 disclosed the invention for a portable terminal having a USB port. The portable terminal has a built-in USB port to be connected to a computer for sending and receiving data between the portable terminal and the computer anytime and anywhere without the need to carry a separate USB cable. The USB port of the portable terminal includes a USB connector to be connected to a computer and a cable connecting the USB connector to a mobile phone. A cable storage is formed in the portable terminal to store the cable and the cable storage includes a structure elastically pulling the cable into the cable storage. The cable can be pulled out by force in order for the USB port to be used and when the USB port is not in use, the cable can be pulled into the cable storage by the elastic force of the structure.

However, the above terminal device has a very complicated structure and it is not easy to repair if it is broken, and because the USB port is integrally formed in a terminal device, it is not compatible with other types of terminal devices.

PRIOR ART

Korean Patent No. 20-0362826
Korean Patent Publication 10-2004-0104943
Korean Patent No. 20-0457265

SUMMARY OF THE INVENTION

The present invention contrives to solve the disadvantages of the prior art. The present invention provides a mobile phone device case having a detachable cable.

The object of the invention is to provide a case having a detachable USB cable for a mobile phone in which the USB cable is stored in the case and can be easily and conveniently attached and detached to and from the case so that a user can carry the USB cable along with the mobile phone.

Another object of the invention is to provide a case having a detachable USB cable in which the USB cable rotates about the hinge of the case at the angle a user wishes to support and make the mobile phone stand.

Still another object of the invention is to provide a case having a cable housing and a detachable cable constructed to fit into the cable housing of the mobile phone case. The cable comprises a USB connector, constructed to be connected to a port of an external device such as computers or mobile phone chargers, and a mobile phone connector constructed to be connected to a port of a mobile phone. The cable also includes a data cable connecting the USB and mobile phone connectors for transmitting data.

Still another object of the invention is to provide a case having a cable housing having a first receptacle for receiving the USB connector of the cable, a second receptacle for receiving the mobile phone connector of the cable, and a receptacle hole formed between the first and second receptacles for exposing the cable so that the cable can be detached from the cable housing.

The data cable may include a groove pattern formed on a surface of the data cable so that the data cable bends over forward or backward.

The data cable may further include a crease tube which is constructed to bend over upward or downward, or leftward or rightward. In addition, the crease tube may be elastic and extendable lengthwise.

The data cable further includes a handle exposed and protruding from the data cable. Pushing the handle to a certain direction allows the data cable to bend over to that direction and detach from the cover.

The cable may further include a USB data storage fixedly attached to an end of the USB connector.

The case may further include a hinge for outwardly rotating the cable. The hinge is formed on a location where a side of the cable meets the cable housing. The hinge comprises pivot pins formed on about both ends of the side of the cable and pivot pin receptacles, to receive the pivot pins, formed on about corresponding both ends of the cable housing.

The pivot pins and pivot pins may be in polygonal shapes in order for the cable to outwardly rotate at predetermined angles and support the mobile phone. In this structure, the cable can rotate at a certain angle a user wishes it to rotate and support the mobile phone and make the mobile phone stand on the cable.

The cable housing may further include a groove mating pattern constructed to complement a portion of the groove pattern of the cable to help the cable snuggly fit into the cable housing.

The cable may further include a flexible display on an exterior side of the cable for displaying information of dates, times, battery charging indicator or data transmission indicator.

The fuller understanding and various embodiments of the invention can be obtained by the following drawings, detailed description, and appended claims.

The advantages of the present invention includes (1) the mobile phone case of the present invention has a detachable cable attached to the cable housing of the case in order for a user to prevent loss of the cable and conveniently carry the cable along with the mobile phone without compromising the external esthetic view of the mobile phone case; (2) the detachable cable of the mobile phone case can play the role of a stand that supports the mobile phone in various positions, and the cable when detached from the cover can be used as a USB cable to send or receive data from external devices.

Although the present advantages are briefly summarized, the fuller understandings of the invention can be obtained by the following drawings, detailed description, and appended claims.

BRIEF DESCRIPTION OF THE DRAWINGS

These are other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
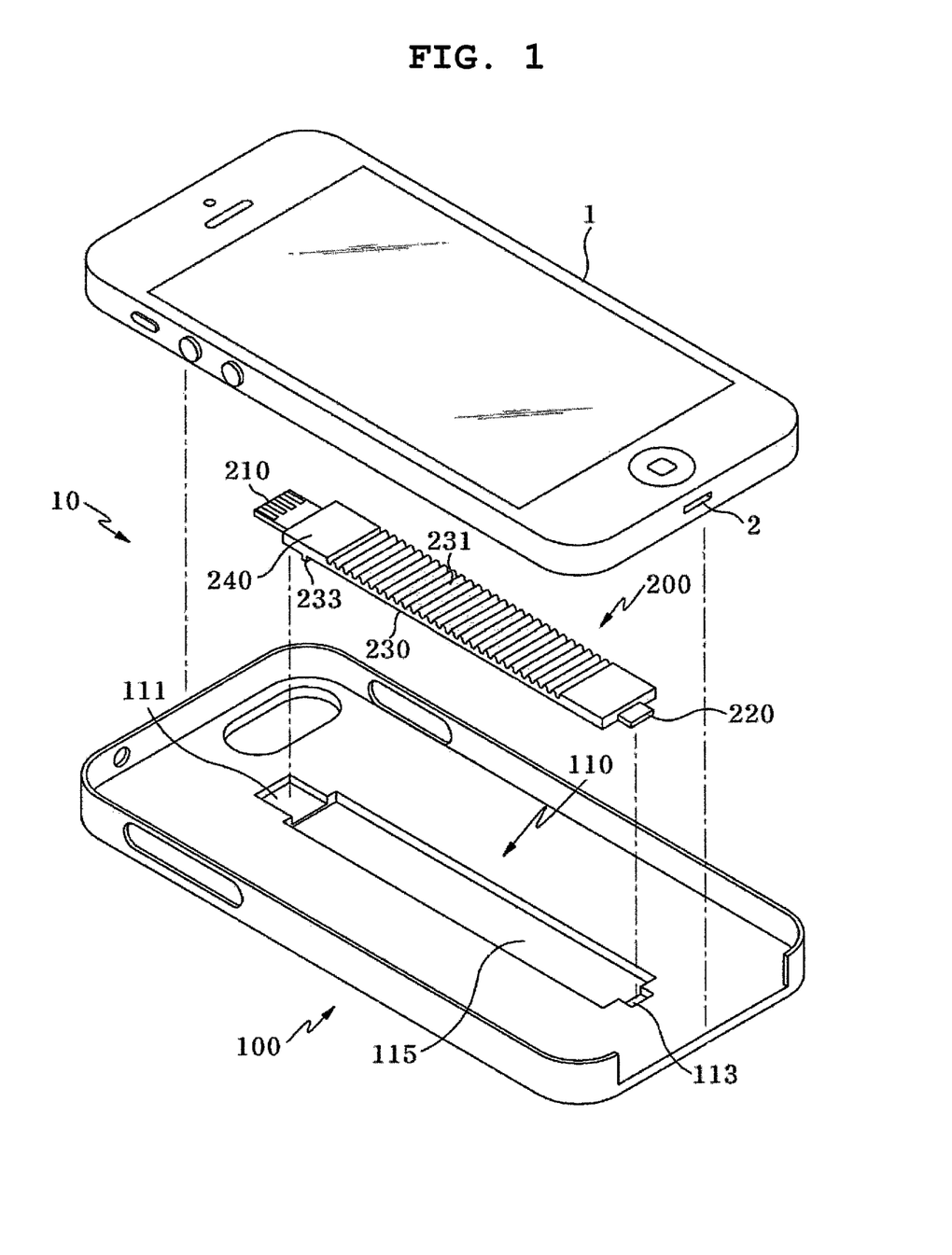
FIG. 1 shows an exploded view of a mobile phone case having a detachable cable according to one embodiment of the present invention.
Figure 2:
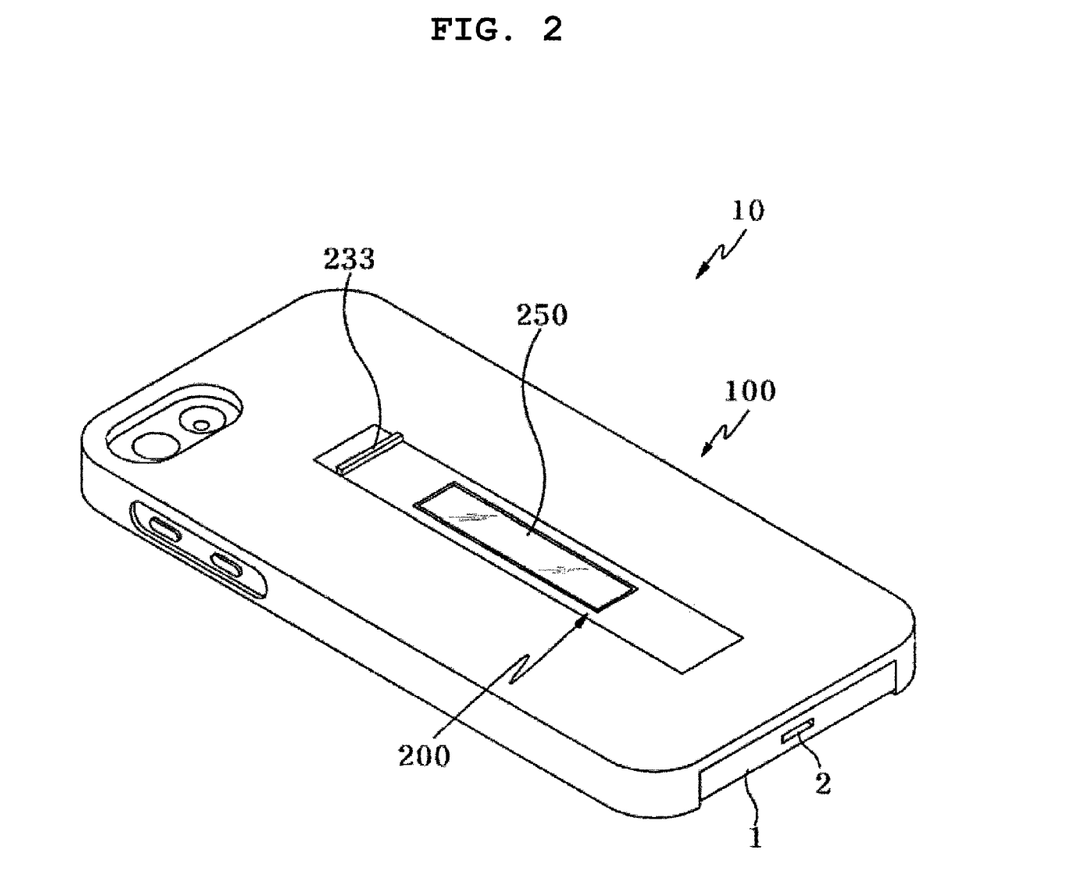
FIG. 2 shows a rear perspective view of the mobile phone case having a detachable cable.
Figure 3:
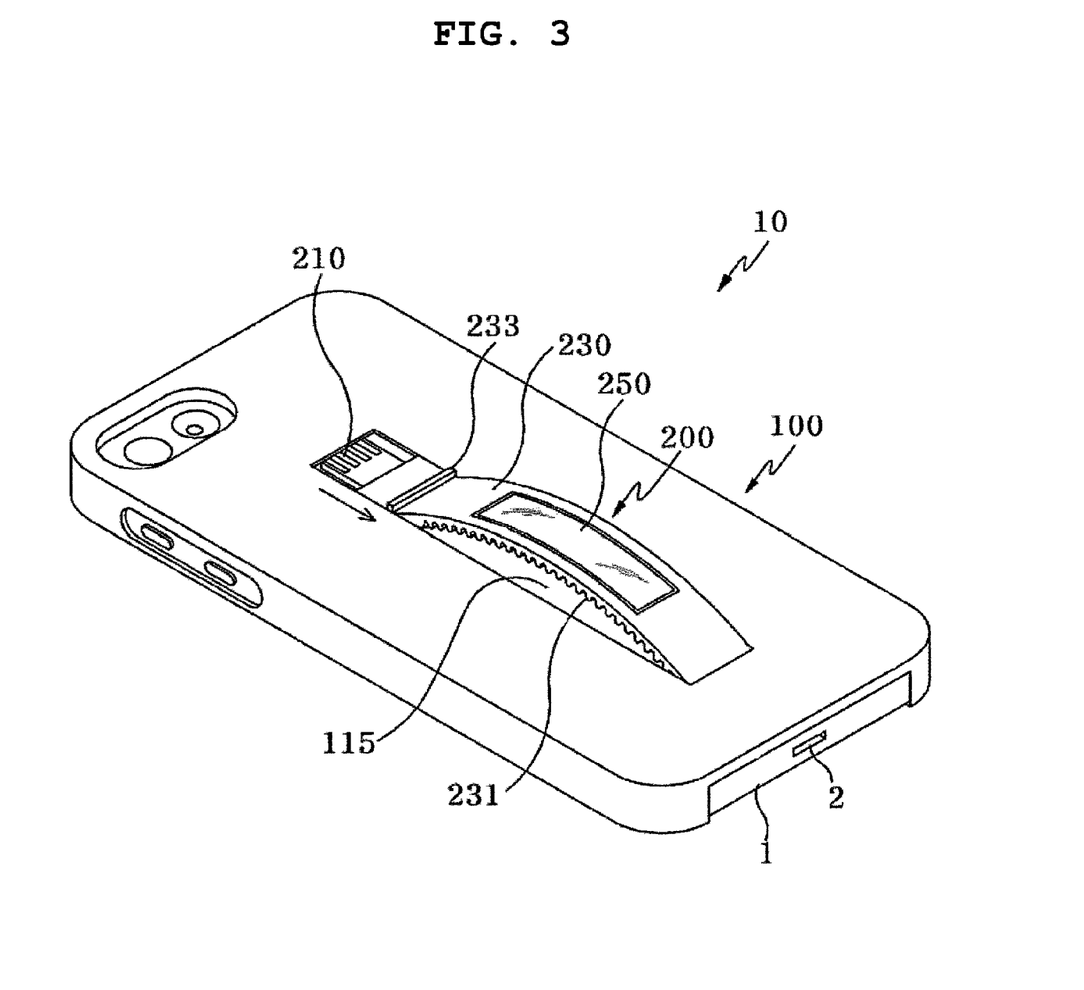
FIG. 3 shows a rear perspective view of the mobile phone case having a detachable cable with the data cable bent.
Figure 4:
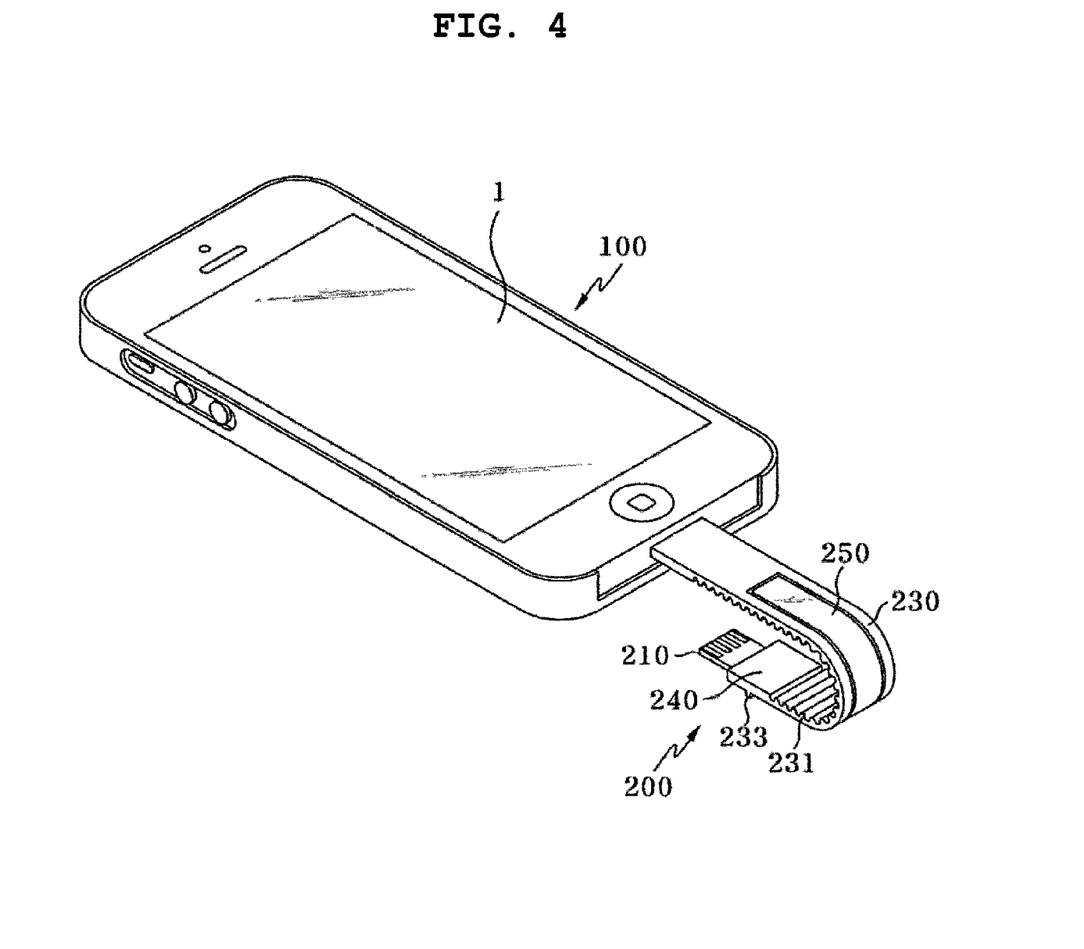
FIG. 4 shows the mobile phone case with the detachable cable detached from the case and connected to the port of the mobile phone.
Figure 5:
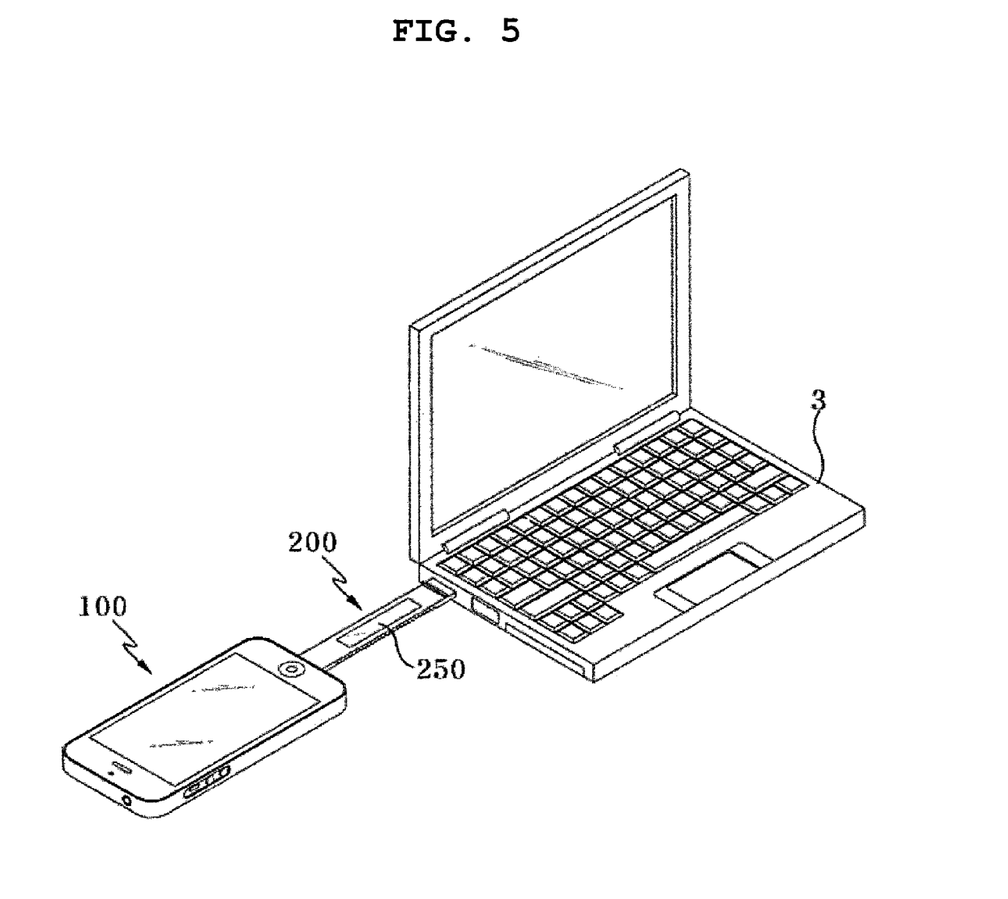
FIG. 5 shows the mobile phone case with the detachable cable detached from the case and connected to the port of the mobile phone and the USB port of a computer.

FIG. 1 shows an exploded view of a mobile phone case having a detachable cable according to one embodiment of the present invention and FIG. 2 shows a rear perspective view of the mobile phone case having a detachable cable. FIG. 3 shows a rear perspective view of the mobile phone case having a detachable cable with the data cable bent and FIG. 4 shows the mobile phone case with the detachable cable detached from the cover and connected to the port of the mobile phone. In addition, FIG. 5 shows the mobile phone case with the detachable cable detached from the cover and connected to the port of the mobile phone and the USB port of an external device such as a computer.

FIGS. 1 through 5 respectively show a case 10 having a cover 100 to protect a mobile phone 1 and a detachable cable 200 having a USB data storage 240 for storing or transmitting data from external devices.

The USB data storage 240 is used to store or send out the data received from an internal device such as a mobile phone 1 or an external device such as a computer 3. This kind of background technology is known to the person of ordinary skill in the art and it will be omitted here.

The cable 200 comprises a USB connector head 210 formed on one end constructed to be connected to a USB port of an external device (hereinafter referred to as "computer"), a mobile phone connector 220 on the other end constructed to be connected to a port 2 of the mobile phone 1, a data cable 230 connecting the USB connector 210 and the mobile phone connector 220 to receive and send data between the mobile phone 1 and the computer 3, and a flexible display 250 having flexibility of freely bending.

The data cable 230 can be used to send data from the mobile phone 1 to the computer 3 or to receive data from the computer 3 to the mobile phone 1. The data cable 230 can be made to be thin plate or strip having a groove pattern 231 on the one surface of the data cable 230 so that the data cable can freely bend over.

The groove pattern 231 of the data cable 230 can be formed to have elasticity to return to its original form once a force to bend the data cable is released, decreased or removed.

The data cable 230 may further comprise a crease tube (not shown) which is constructed to bend over upward or downward, or leftward or rightward such that the crease tube is elastic and expandable lengthwise.

The crease tube (not shown) connects the USB connector 210 and the mobile phone connector 220 to adjust the distance between them. For example, the crease tube can be extended if the length of the cable 200 is short when the mobile phone connector 220 is connected to the mobile phone port and the USB connector 210 is being tried to be connected to a USB port of a computer.

The data cable 230 may further comprise a handle 233 exposed and protruding from the data cable 230.

Pushing the handle 233 to a direction allows the data cable 230 to bend over to that direction and easily detach from the cover 100.

In other words, a user can push the handle 233 toward a direction, the data cable 230 bends over to form an arch and the USB connector 210 detaches from a first receptacle 111. Then, by pulling the USB connector 210, the mobile phone connector 220 detaches and released from a second receptacle 113 and the detached mobile phone connector 220 can be connected to a mobile phone port 2.

The flexible display 250 formed on the exterior surface of the cable 200 displays date, time, battery charging status and/or data transmission status. If the data cable 230 bends over, the flexible display 250 bends together with the data cable 230. The background technology on the flexible display 250 is known to the one of ordinary skill in the art and the explanation on that will be omitted.

The cover 100 covers the back and sides of the mobile phone 1, and the size and design of it 100 can be varied depending on the types of a mobile phone 1. The cover 100 may be made of strong and durable metals or synthetic resins made of eco-friendly materials but not limited to those materials. The cover 100 may further comprise a cable housing 110.

The cable housing 110 is constructed to snuggly receive the detachable cable 200, allowing the users to conveniently carry the cable along with the mobile phone without the need to buy an additional USB cable. The cable housing 110 can be constructed on the interior of the cover 100, and the detachable cable 200 detachably attaches to the cable housing 110 of the cover 100.

The cable housing 110 comprises a first receptacle 111 constructed to receive the USB connector 210 of the cable 200 and protect the USB connector 210 from possible contamination; a second receptacle 113 formed on the opposite side of the cover 100 from the first receptacle 111, constructed to receive the mobile phone connector 220 of the cable 200 and protect the mobile phone connector 220 from possible contamination; and a receptacle hole 115 formed between the first and second receptacles 111 and 113 and configured to snuggly receive the data cable 230 and expose one side of the cable to the exterior of the cover 100.

The size and design of the cable housing 110 can be varied depending on the size and design of the cover 100, but the cable housing 110 is not limited to this and the one of ordinary skill in the art may change the design and the present invention includes such variations.

Explanation on another embodiment will be described below. Same reference numbers as the first embodiment will be used for the second embodiment. Detail explanations on same construction, structure and effect as the first embodiment may be omitted, and new features will be explained.

Reference numbers in FIGS. 1 through 5 may be referred to for the reference numbers which are not shown for FIGS. 6 through 9.

Figure 6:
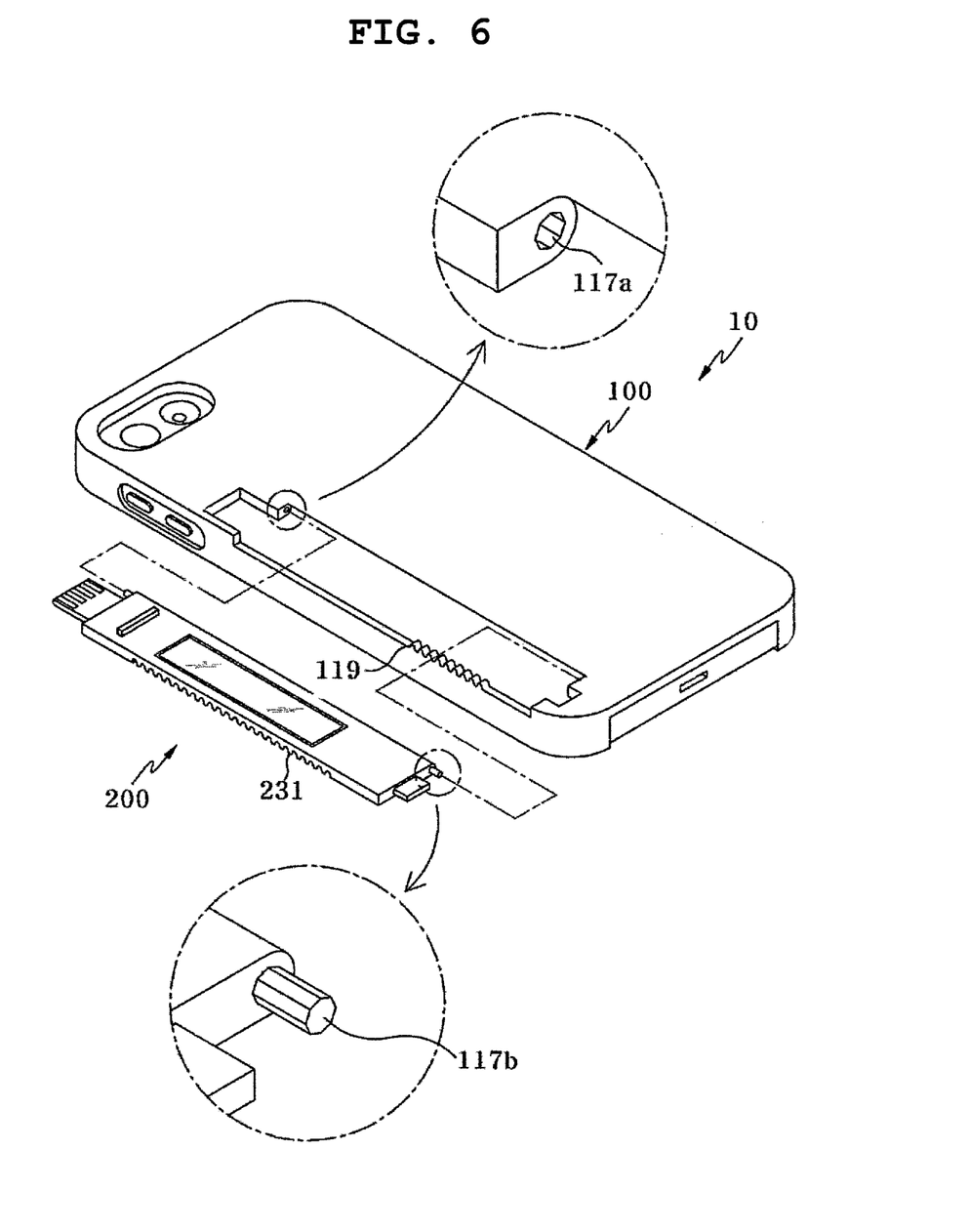
FIG. 6 shows an exploded view of a mobile phone case having a detachable cable according to another embodiment of the present invention.
Figure 7:
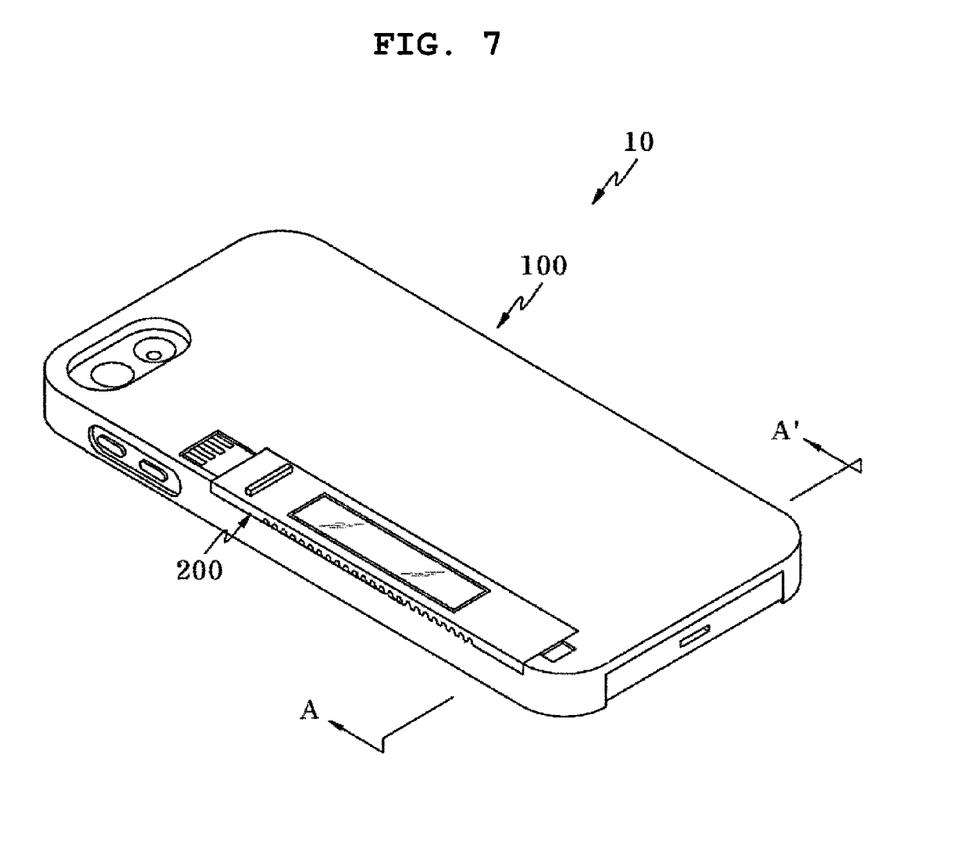
FIG. 7 shows the mobile phone case having a detachable cable of FIG. 6.
Figure 8:
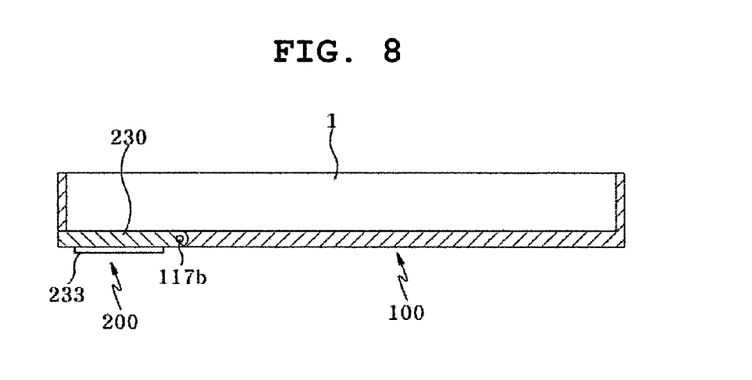
FIG. 8 shows a A-A' cross-sectional view of the mobile phone case having a detachable cable.
Figure 9:
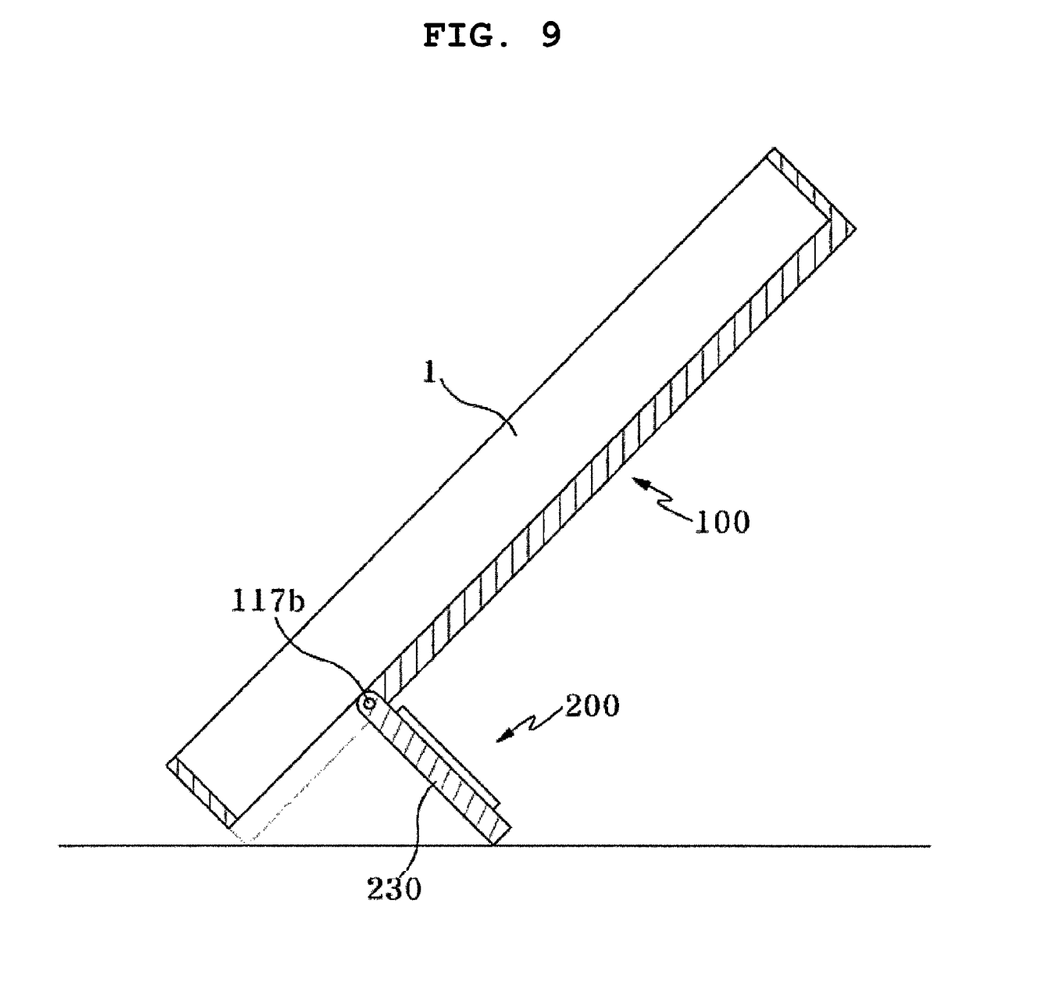
FIG. 9 shows the mobile phone case with the detachable cable outwardly rotated at the hinge.

FIG. 6 shows an exploded view of a mobile phone case 10 having a detachable cable 200 according to another embodiment of the present invention. FIG. 7 shows a perspective view of the mobile phone case 10 having a detachable cable 200 and FIG. 8 shows an A-A' cross-sectional view of the mobile phone case 10 having a detachable cable 200. In addition, FIG. 9 shows the mobile phone case 10 with the detachable cable 200 outwardly rotated at the hinge 117.

FIGS. 6 through 9 respectively show a detachable cable 200 attached to a cable housing 110. The cable housing 110 comprises a hinge 117 and a groove mating pattern 119.

The hinge 117 comprises pivot pins 117b formed on both ends of the cable and pivot pin receptacles 117a formed on both inner ends of the cable housing.

The pivot pins 117b and pivot pin receptacles 117a of the hinge 117 are in polygonal shapes structurally complementing and mating with each other.

Therefore, the pivot pins 117b and pivot pin receptacles 117a complementing each other allow the cable 200 to rotate outwardly from the cover 100 at the hinge 117, allowing the cable 200 to play as a role of a stand to support the mobile phone at an angle a user wishes.

The groove mating patterns 119 are constructed on the exterior side of the cover 100, complementing and mating with a portion of the groove pattern 231 of the cable 200 to help the cable 200 snuggly fit into the cable housing 110.

Therefore, the groove mating patterns 119 can be constructed to avoid the possible separation of the cable 200 from the cable housing 110 through external impacts.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A mobile phone case having a detachable cable, the case comprising:
    a cable housing; and
    a cable detachably attached and received in the cable housing,
    wherein the cable comprises
        a universal serial bus (USB) connector constructed to be connected with a US port of an external device;
        a mobile phone connector constructed to be connected with a port of a mobile phone;
        a data cable for connecting and transmitting data between the USB connector and the mobile phone connector;
        a hinge for outwardly rotating the cable wherein the hinge is formed on a location where a side of the cable meets the cable housing, wherein the hinge comprises pivot pins formed on about both ends of the side of the cable and pivot pin receptacles, to receive the pivot pins, formed on about corresponding both ends of the cable housing; and
        a flexible display on an exterior side of the cable for displaying information of dates, times, battery charging indicator or data transmission indicator.

2. The mobile phone case of claim 1, wherein the cable housing comprises a first receptacle, a second receptacle and a receptacle hole wherein the USB connector is received in and detachably attached to the first receptacle and the mobile phone connector is received in and detachably attached to the second receptacle, and wherein the receptacle hole is formed between the first and second receptacles for exposing the cable so that the cable can be detached from the cable housing.

3. The mobile phone case of claim 1, wherein the data cable comprises a groove pattern formed on a surface of the data cable so that the data cable bends over forward or backward.

4. The mobile phone case of claim 1, wherein the data cable comprises a crease tube which is constructed to bend over upward or downward, or leftward or rightward wherein the crease tube is elastic lengthwise.

5. The mobile phone case of claim 1, wherein the data cable further comprises a handle exposed and protruding from the data cable wherein pushing the handle to a direction allows the data cable to bend over to the direction and detach from the case housing.

6. The mobile phone case of claim 1, wherein the cable further comprises a USB data storage fixedly attached to an end of the USB connector.

7. The mobile phone case of claim 1, wherein the pivot pins and pivot pins are in polygonal shapes in order for the cable to outwardly rotate at predetermined angles and support the mobile phone.

8. The mobile phone case of claim 1, wherein the cable housing further comprises a groove mating pattern constructed to complement a portion of the groove pattern of the cable to help the cable snuggly fit into the cable housing.

\* \* \* \* \*